Sept. 8, 1959 H. O. SEIGEL 2,903,642
METHOD OF MOBILE ELECTROMAGNETIC PROSPECTING
Filed June 23, 1955 3 Sheets-Sheet 1

Inventor
HAROLD O. SEIGEL
By~ Fetherstonhaugh & Co.
Attys

Sept. 8, 1959 H. O. SEIGEL 2,903,642
METHOD OF MOBILE ELECTROMAGNETIC PROSPECTING
Filed June 23, 1955 3 Sheets-Sheet 2

Inventor
HAROLD O. SEIGEL
By~ Fetherstonhaugh & Co.
Attys

Sept. 8, 1959  H. O. SEIGEL  2,903,642
METHOD OF MOBILE ELECTROMAGNETIC PROSPECTING
Filed June 23, 1955  3 Sheets-Sheet 3

Inventor
HAROLD O. SEIGEL
By~ Fetherstonhaugh+Co.
Atty's

United States Patent Office 2,903,642
Patented Sept. 8, 1959

2,903,642

METHOD OF MOBILE ELECTROMAGNETIC PROSPECTING

Harold Oscar Seigel, Toronto, Ontario, Canada, assignor to Rio Canadian Exploration Limited, Toronto, Canada Application June 23, 1955, Serial No. 517,573

15 Claims. (Cl. 324—6)

This invention relates to a method and apparatus of inductive electromagnetic prospecting.

Electromagnetic prospecting methods wherein exploring alternating magnetic fields are created to link formations under the earth's surface and the resultant magnetic field detected and measured as the apparatus is moved over the ground are well known. One such method is described in United States Patent 2,642,477 to Puranen. I have devised an electromagnetic prospecting method which is novel and has advantage over previous methods when used under conditions wherein it is impossible to maintain the distance and relative orientation between the transmitting coils which set up the exploring magnetic fields and the receiving coils which detect the magnetic field constant.

Generally speaking, my method of inductive electromagnetic prospecting comprises the steps of creating two magnetic search fields of substantially the same orientation in space, but of different frequencies. The frequencies are chosen with sufficient difference between them that the effect of ore bodies on the magnetic fields created thereby is substantially different. It is preferable that one of the frequencies gives rise to a magnetic field that is little affected by a conductor in the earth and that the other of the frequencies is relatively sensitive to a conductor in the earth.

The magnetic fields created by the transmitting coils are measured at points spaced therefrom by means of voltages generated in pick-up coils. The pick-up coils are arranged at an incline to each other whereby the direction of the resultant field in a third plane containing the axes of the two coils can be determined. These components give an indication of the direction of the magnetic field in the third plane which, when compared at the two frequencies, gives an indication of the presence of a subsurface conductor.

The invention will be clearly understood after reference to the following detailed specification read in conjunction with the drawings.

Figure 1:
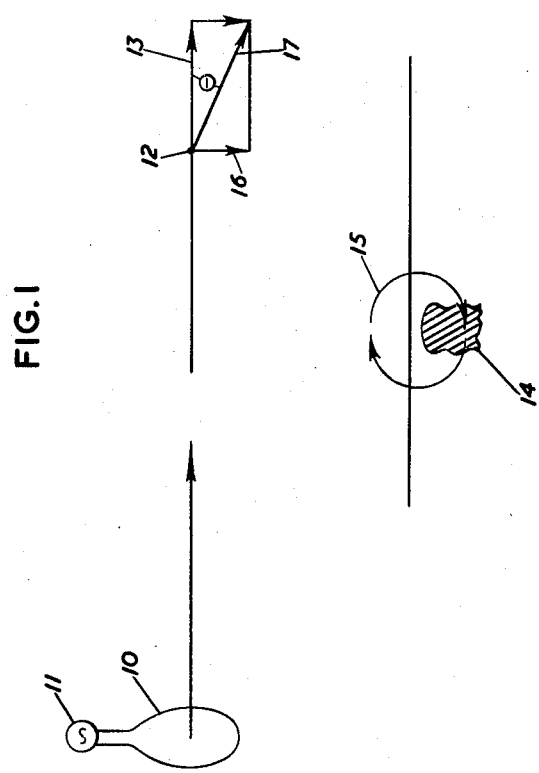
Figure 1 is a view schematically illustrating a transmitting coil over a conductor disposed under the earth.

Referring to the drawings, and at first to Figure 1, numeral 10 refers to a transmitting coil electrically connected to a source 11 of alternating electrical current. The source 11 operates to energize the coil 10 and thereby create a magnetic field which in the presence of no subsurface conductors would have a field at the point 12 represented by the vector 13.

There is, however, a subsurface body of a conducting material 14 and the alternating magnetic field transmitted from coil 10 induces eddy currents in it. These eddy currents give rise to a secondary magnetic field indicated by the numeral 15, and at the point 12 the secondary magnetic field has a value indicated by the vector 16. The resultant magnetic field of the principal field generated by the coil 10, and the secondary field generated by the eddy currents in the conductor body 14 is indicated by the vector quantity 17. The presence of an appreciable angle $\theta$ between the vector 13 representing the undisturbed magnetic field and the resultant magnetic field 17 is an indication of the presence of conductor. My method of electromagnetic prospecting is based upon the variation in direction of the resultant magnetic field 17 due to the presence of conductor anomalies and transmitting and receiver coils are moved over the earth's surface.

I would like to add at this point of the specification that it is known that the secondary field created by some anomalies is substantially in phase with the undisturbed magnetic field while the secondary field created by other anomalies is approximately ninety degrees out of phase with the undisturbed field. Generally speaking the conductors which are of importance give rise to magnetic fields that are in phase with the undisturbed field, while anomalies such as clays, muskegs, lakes, etcetera, which are of no economic interest, give rise to secondary fields that are nearly ninety degrees out of phase with the principal or undisturbed field. Usually then I measure the component of the secondary field due to the conductor 14 that is in phase with the undisturbed field.

I am concerned with setting up a method of prospecting that is not affected by the orientation of the planes through which the magnetic fields are detected and is not affected by small variations in the spacing between detecting units and the transmitting units. I therefore take measurements of the magnetic fields through planes that are inclined to each other at two different frequencies, the field of one of which is not materially affected by the presence of subsurface conductors, and the field of the other of which is materially affected by the presence of subsurface conductors, and I compare the angles $\theta$ at the two frequencies as an indication of the presence of a conductor anomaly as the transmitting and receiving coils are moved over the ground. With orientation of the receiving coils the angle $\theta$ will vary. However, the ratio of $\tan \theta$ at one frequency to $\tan \theta$ at the other frequency will remain unchanged with orientation in the absence of subsurface conductors. The principal factor affecting the ratio of $\tan \theta$ at one frequency to the other frequency will be the presence of an anomaly due to a conductor.

Figure 2:
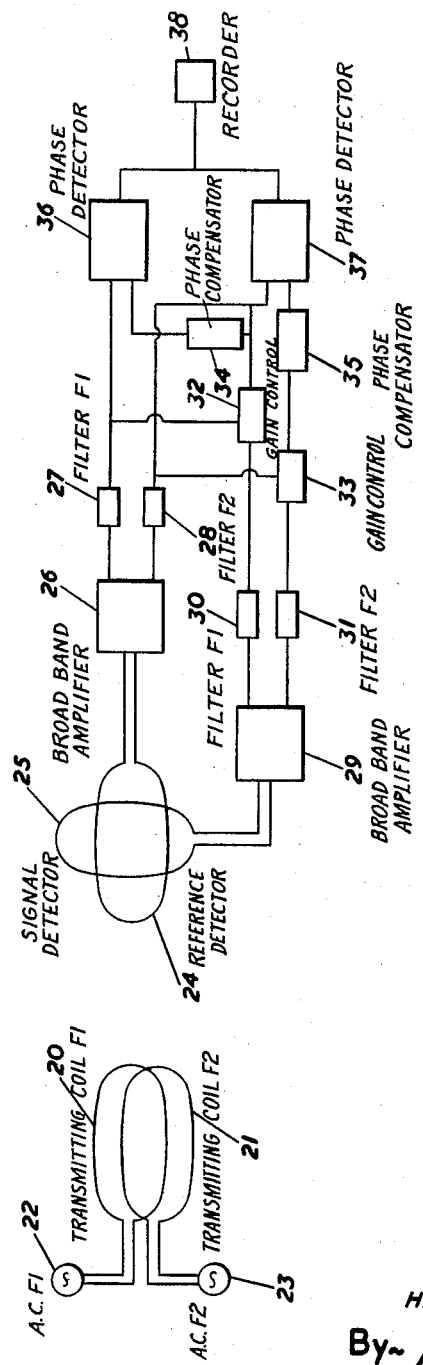
Figure 2 is a block diagram of an instrumentation for carrying out my invention.

In Figure 2 I illustrate an instrumentation for practicing my invention. It includes two transmitting coils 20 and 21. Coil 20 is electrically connected to an alternating current source 22 of frequency $f1$ and coil 21 is electrically connected to an alternating current source 23 of frequency $f2$. Frequency $f1$ is preferably very low, that is, between 10 to 80 cycles, and the magnetic field created thereby is little affected by the presence of subsurface conductors of normal interest. Frequency $f2$ is in the range of 1000 to 5000 cycles and the magnetic field created thereby is considerably affected by the ore bodies of usual interest. A specific combination within these ranges suitable for base metal sulphide bodies, for example, could be $f1$ of 50 cycles per second and $f2$ of 1025 cycles per second.

Detector coils 24 and 25 orthogonally arranged with respect to each other and tuned to detect the frequencies $f1$ and $f2$ are in use located in the magnetic fields transmitted by the transmitting coils 20 and 21. Detector coil 24 is a reference coil and is oriented such that under normal conditions it picks up approximately the major component of the magnetic field transmitted from the coils 20 and 21 when no subsurface conductors are present. The separation of the transmitting coils 20 and 21 and the receiving coils 24 and 25 is normally in the neighborhood of 100 to 500 feet. A tilt in the order of 20 degrees, plus or minus, from parallel between the coil 24 and the coils 20 and 21 is permissible.

It will be noted that the transmitting coils in Figure 2 are generally parallel to the general contour of the ground, whereas the transmitting coil in Figure 1 is vertical with respect to the ground. The disposition of the transmitting coils depends upon the ore bodies sought. If they are flat-lying, a coil disposition as illustrated in Figure 1 would be preferable. If, on the other hand, the ore bodies are vertically inclined, a coil disposition such as illustrated in Figure 2 is preferable. In general, the orientation of the coils 20 and 21 is arranged so that their plane is parallel to the conducting ore bodies of interest. This ensures the maximum "coupling" between the transmitting coils and the ore bodies.

Coil 25 is called the "signal" coil and it is orthogonally disposed with respect to the reference coil 24. Since the reference coil 24 is normally substantially in the same plane as or parallel with the transmitting coils, it will pick up predominantly the magnetic field set up by the transmitting coils. The signal receiving coil 25, however, will be fairly sensitive in the detection of secondary magnetic field set up by eddy currents in conductor bodies because it normally picks up very little of the magnetic fields set up by the transmitting coils, being close to the "null" direction.

The output of reference coil 24 at both frequencies is amplified in a broad band amplifier 26. The output of the broad band amplifier 26 is separated into its frequency components $f1$ and $f2$ by means of the filters 27 and 28 respectively.

The output of the signal coil 25 is amplified in a broad band amplifier 29 and then separated into its frequency components by means of the filters 30 and 31.

Numerals 32 and 33 are automatic gain control devices, electrically connected as indicated, for varying the amplified component of frequency $f1$ of the signal coil 25 (i.e. from the filter 30) in such a way that is inversely proportional to the amplitude of the amplified signal at frequency $f1$ from reference coil 24, and varying the amplified component of frequency $f2$ of the signal coil 25 such that it is inversely proportional to the amplitude of the signal of frequency $f2$ of reference coil 24 (i.e. from the filter 31) respectively. Thermistor attenuators or other devices well known in the art may be used as an automatic gain control device.

The outputs of automatic gain control devices 32 and 33 are then fed to phase compensating devices 34 and 35 respectively, which compensate for any relative phase shifts introduced into the signals of frequencies $f1$ and $f2$ of the signal coil 25 as a result of the operation of the amplifiers, filters 30 and 31, and automatic gain control devices 32 and 33.

The output of phase shift device 34 is then fed to a phase detector 36. A signal of frequency $f1$ from the filter 27 is also fed to phase detector 36 as a reference voltage. Phase detector 36 functions to separate the component of frequency $f1$ in the output of the automatic gain control device 34 that is in phase with the signal frequency $f1$ from the reference coil. The output of phase detector 36 is a D.C. signal whose amplitude is proportional to the ratio of the component of frequency $f1$ of the signal coil 25 that is in phase with the component of the same frequency received by the reference coil, divided by the magnitude of the latter component. It is therefore proportional to the tangent of the angle $\theta$ in the plane common to the axes of the orthogonally disposed coils 24 and 25.

The output of phase shift device 35 is fed to the phase detector 37 and a signal of frequency $f2$ from filter 28 is also applied to the phase detector 37 as a reference voltage. Phase detector 37 detects the in-phase component of the signal of frequency $f2$ from the output of gain control device 35 and functions in a manner similar to the phase detector 36 to give a D.C. signal whose amplitude is proportional to the ratio of the component of frequency $f2$ received by the signal coil which is in phase with the component of frequency $f2$ received by the reference coil 24, divided by the magnitude of the latter component.

The outputs of phase detector 36 and phase detector 37 are adjusted so that for an undistorted magnetic field in the absence of any subsurface conductors they are equal. The outputs are mixed in opposition and the resultant different voltages applied to an automatic recorder or quotient meter 38.

In the absence of subsurface conductors, then, the outputs of phase detectors 36 and 37 will be identical and cancel, regardless of the variations in separation between the transmitter and receiving coils and regardless of the relative orientations of the transmitting and receiving coils in use. In the presence of a subsurface conductor the angle $\theta$ for frequency $f2$ will vary to a considerably greater extent than the angle $\theta$ for frequency $f1$ and a reading will be obtained on the automatic recorder or quotient meter 38 to indicated the presence of the conductor.

A person skilled in the art would have no difficulty in designing suitable phase detectors 36 and 37. A discussion of such circuit elements will be found in a book entitled "Nuclear Magnetic Resonance" by E. R. Andrews, the Cambridge University Press at page 44 and in an article by N. A. Shuster appearing in the review of scientific instruments, volume 52, 1951 at page 254. Other sources are well known to persons skilled in the art.

While I have illustrated the receiving coils as orthogonally arranged, it will be apparent that they need not be so arranged. It is necessary, of course, that they be at an incline to each other whereby the direction of a resultant field can be determined. It is merely the change in direction of the resultant that I employ as an indication of a conductor body. However, in the apparatus illustrated in Figure 2, it should be noted that the reference coil should be approximately parallel to the transmitting coils as indicated above, because it is the in-phase component of the secondary field that I am concerned with, and it is a voltage from the reference coil that I employ as a reference voltage in the phase detector. If the reference coil is inclined to too great an extent a fairly large percentage of secondary field will circle it and the efficiency of the separation of the component of the signal in phase with the transmitted signal and magnetic field will decrease.

Figure 3:
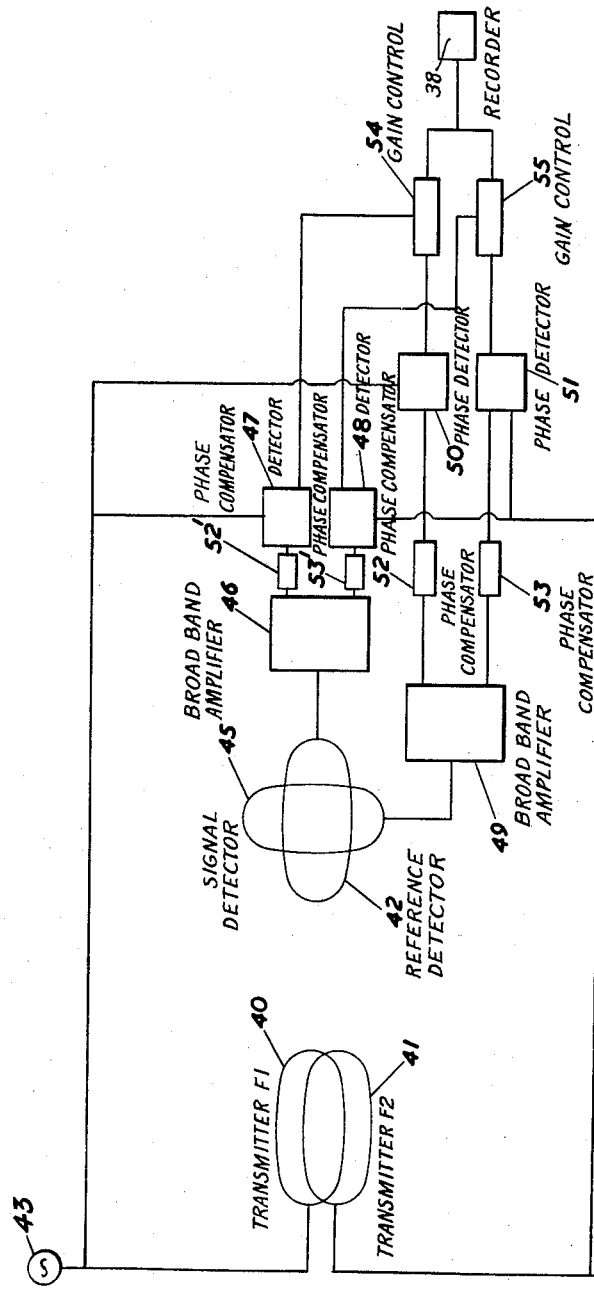
Figure 3 is a block diagram of an alternative instrumentation for carrying out my invention.

In Figure 3 I illustrate an instrumentation wherein it is not as necessary to maintain the reference coil 42 substantially parallel to the transmitting coils 40 and 41. In this case, the reference voltage for the phase detectors is taken directly from the alternating current sources 43 and 44. The detecting coils 42 and 45 are again illustrated as orthogonally arranged with respect to each other, and the transmitting coils 40 and 41 are also arranged to transmit fields of frequencies $f1$ and $f2$ having normally substantially the same orientation in space. The output of the reference coil 42 is amplified by the broad band amplifier 46 and then fed through the phase compensating devices 52' and 53' to the phase sensitive detectors 47 and 48. Phase compensating devices 52' and 53' compensate for any changes in phase of the signals $f1$ and $f2$ by reason of the operation thereon on the amplifier 46 and other circuitry. The reference voltage for phase detector 47 is the frequency $f1$ of the source 43 and it is connected thereto by direct coupling as illustrated or radio link. The reference voltage of phase detector 48 is the frequency $f2$ of frequency source 44 and it is also connected thereto by direct coupling or radio link.

The output of signal coil 45 is amplified in broad band amplifier 49 and applied to phase sensitive detectors 50 and 51 through phase compensating devices 52 and 53 respectively. The phase compensating devices 52 and 53 compensate for any changes in phase of the signals $f1$ and $f2$ by reason of the operation thereon of the amplifier 49 and other circuitry. The reference voltage for phase detector 50 is frequency $f1$ and it is directly connected to the source 43 thereof by direct coupling or alternatively by radio link. The reference voltage for phase detector 51 is frequency $f2$, and it is connected directly to the source 44 thereof or is connected thereto by radio link, i.e. by means of a radio frequency signal modulated at frequency $f2$.

Phase detector 47 separates the signal of frequency $f1$ in phase with the transmitting frequency $f1$. The output of phase detector 48 has a frequency $f2$ in phase with the transmitting frequency $f2$. The phase detector 50 has a frequency in phase with the transmitting frequency $f1$, and the phase detector 51 has a frequency in phase with the signal $f2$. The outputs of phase detectors 47 and 50 are applied to the automatic gain control device 54, the output of which by design is proportional to the component of the signal in signal coil 45 at $f1$ that is in phase with the alternating frequency source $f1$ to the magnitude of the signal in the reference coil 42 at frequency $f1$, that is, it is representative of the orientation of the resultant magnetic field. The output of gain control device 54 is a D.C. current.

Numeral 55 is a gain control device similar to 54, the output of which is representative of the orientation of the resultant magnetic field at frequency $f2$.

In use, the transmitting and detecting coils are moved over the area to be searched in a vehicle or vehicles. The method lends itself to air prospecting in which case the receiving or search coils are usually mounted in a drogue that is trailed behind the airplane and the transmitter is mounted in the body of the airplane. The separation of the receiver and transmitter is, of course, maintained as constant as possible as is the orientation of all coils, but it is not essential that these factors be maintained constant, as explained above.

My method of prospecting depends upon variations in the direction of the resultant magnetic field created by the transmitted field and the secondary field due to eddy currents. I have described apparatus employing orthogonally arranged detecting coils in which case I compare the tangent of the angle of inclination of the resultant fields when there are eddy currents and when there are no eddy currents as an indication of the direction of the resultant magnetic field. It will be apparent, however, that the search coils need not be orthogonally arranged to obtain a useful result. It is only necessary that they be inclined with respect to each other. In such a case, however, it would not be the tangent of the angle $\theta$ that would be measured by the equipment described. Variations in the angle, however, would still be recorded, and these could be employed to give an indication of the presence of ore bodies. It is only necessary according to my invention that two readings be obtained in planes that are inclined with respect to each other, and compared in the general manner above set forth.

The magnetic search field may, of course, be produced in ways other than that illustrated. It could, for example, be done by means of a rotating magnet and, at lower frequencies, that is frequencies in the range of 10 to 30 cycles per second, a rotating magnet construction may have advantages from the weight and stability points of view, over and above the more conventional motor generator and coil or power oscillator and coil arrangement.

The magnet would be rotated about an axis of rotation through its center point, perpendicular to its long dimension. This ax is of the magnet would be identical with the axis of the high frequency transmitting loop.

I claim:

1. A method of inductive electromagnetic prospecting, comprising the steps of: transmitting two magnetic search fields of substantially the same orientation in space and of different frequencies, said fields being affected differently by conductor anomalies by reason of their frequency difference; measuring the components of said fields through a reference plane and through a signal plane, said latter two planes being inclined with respect to each other whereby the direction of the resultant field, in a third plane, can be determined; examining the resultant magnetic fields in said third plane at said two frequencies; comparing and continuously recording the difference in a property that is a function of the directions of the resultant magnetic fields at various locations in space as an indication of the presence of a conductor anomaly.

2. A method of inductive electro-magnetic prospecting, comprising the steps of: transmitting two magnetic search fields of substantially the same orientation in space and of different frequencies, said fields being affected differently by conductor anomalies by reason of their frequency difference; measuring the components of said fields through a reference plane and through a signal plane, said latter two planes being inclined with respect to each other whereby the direction of the resultant field, in a third plane containing the perpendiculars of said first two mentioned planes at the points of measurement therethrough, can be determined; examining the resultant magnetic fields in said third plane at said two frequencies; comparing and continuously recording the difference in a property that is a function of the directions of the resultant magnetic fields at various locations in space as in indication of the presence of a conductor anomaly.

3. A method of inductive electro-magnetic prospecting as claimed in claim 1, in which the components of said fields measured in said signal plane are of a predetermined phase relationship to the components of said fields measured in said reference plane.

4. A method of inductive electro-magnetic prospecting as claimed in claim 1, in which the components of said fields measured in said signal plane are substantially in phase with the components of said fields measured in said reference plane.

5. A method of inductive electro-magnetic prospecting as claimed in claim 1, in which the components of said fields measured in said signal plane and reference plane are of a predetermined phase relationship to the fields transmitted.

6. A method of inductive electro-magnetic prospecting as claimed in claim 1, in which the components of said fields measured in said signal plane and reference plane are substantially in phase with the transmitted fields.

7. A method of inductive electro-magnetic prospecting as claimed in claim 1, in which said reference plane and said signal plane are at right angles to each other.

8. A method of inductive electro-magnetic prospecting as claimed in claim 1, in which the components of said fields measured in said signal plane and reference plane are of a predetermined phase relationship to the fields transmitted, and in which said reference plane and said signal plane are at right angles to each other.

9. Apparatus for inductive electro-magnetic prospecting, comprising: two magnetic search coils having their principal planes inclined with respect to each other and tuned to receive signals of two frequencies; means for amplifying signals detected by said planes at two frequencies; means for separating the output of said amplifying means into the two frequencies received by each of said coils; means for detecting at each of said frequencies the component thereof of a predetermined phase; and means for determining from said components the resultant magnetic field at each of said frequencies in a third plane.

10. A method of inductive electro-magnetic prospecting as claimed in claim 2, in which the components of said fields measured in said signal plane are of a predetermined phase relationship to the components of said fields measured in said reference plane.

11. A method of inductive electro-magnetic prospecting as claimed in claim 2, in which the components of said fields measured in said signal plane are substantially in phase with the components of said fields measured in said reference plane.

12. A method of inductive electro-magnetic prospecting as claimed in claim 2, in which the components of said fields measured in said signal plane and reference plane are of a predetermined phase relationship to the fields transmitted.

13. A method of inductive electro-magnetic prospecting as claimed in claim 2, in which the components of said fields measured in said signal plane and reference plane are substantially in phase with the transmitted fields.

14. A method of inductive electro-magnetic prospecting as claimed in claim 2, in which said reference plane and said signal plane are at right angles to each other.

15. A method of inductive electro-magnetic prospecting as claimed in claim 2, in which the components of said fields measured in said signal plane and reference plane are of a predetermined phase relationship to the fields transmitted, and in which said reference plane and said signal plane are at right angles to each other.

References Cited in the file of this patent

UNITED STATES PATENTS

| | | |
|---|---|---|
| 2,139,460 | Potapenko | Dec. 6, 1938 |
| 2,608,602 | Muffly | Aug. 26, 1952 |
| 2,623,924 | Cartier et al. | Dec. 30, 1952 |
| 2,690,537 | Weiss et al. | Sept. 28, 1954 |
| 2,794,949 | Hedstrom | June 4, 1957 |